Patented Feb. 13, 1923.

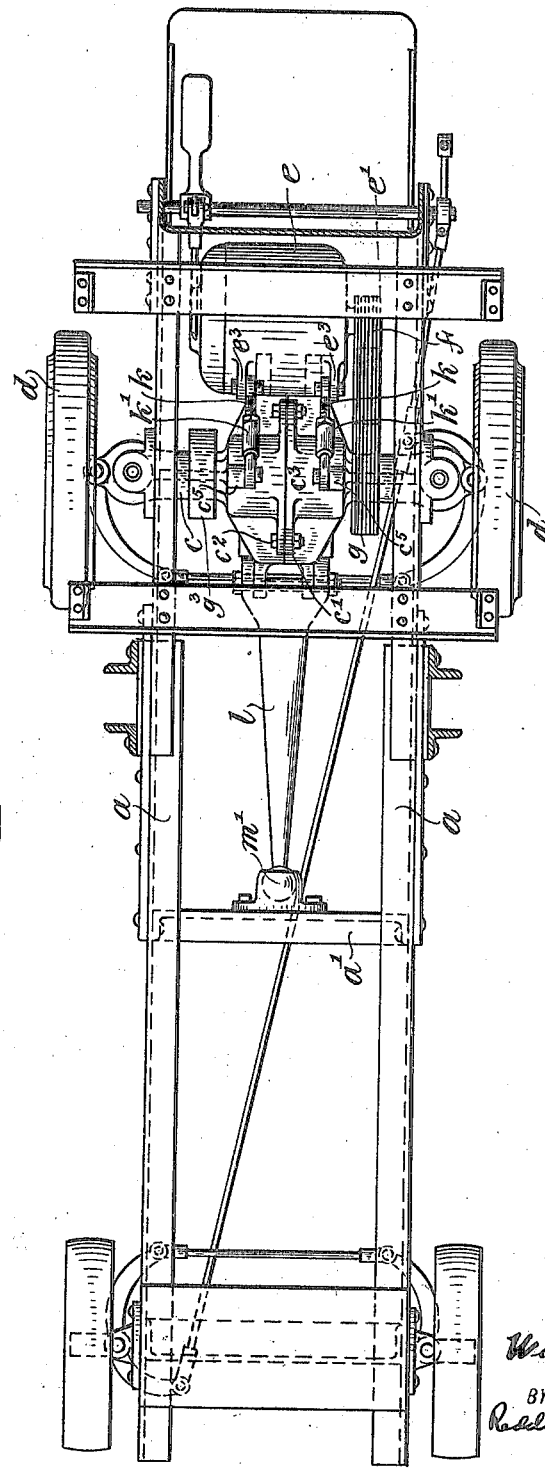

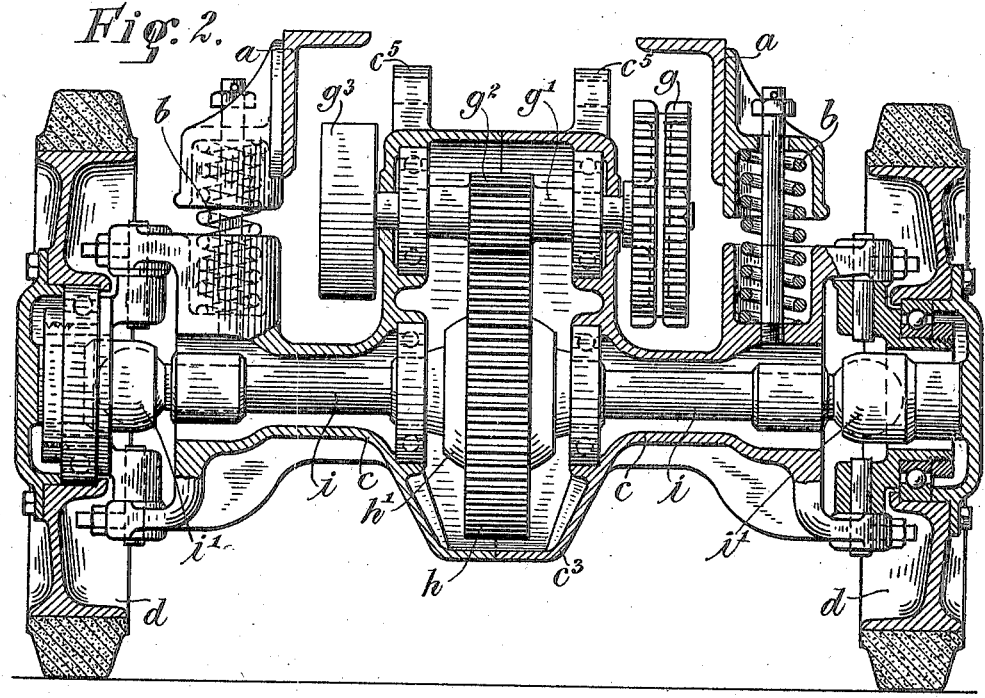
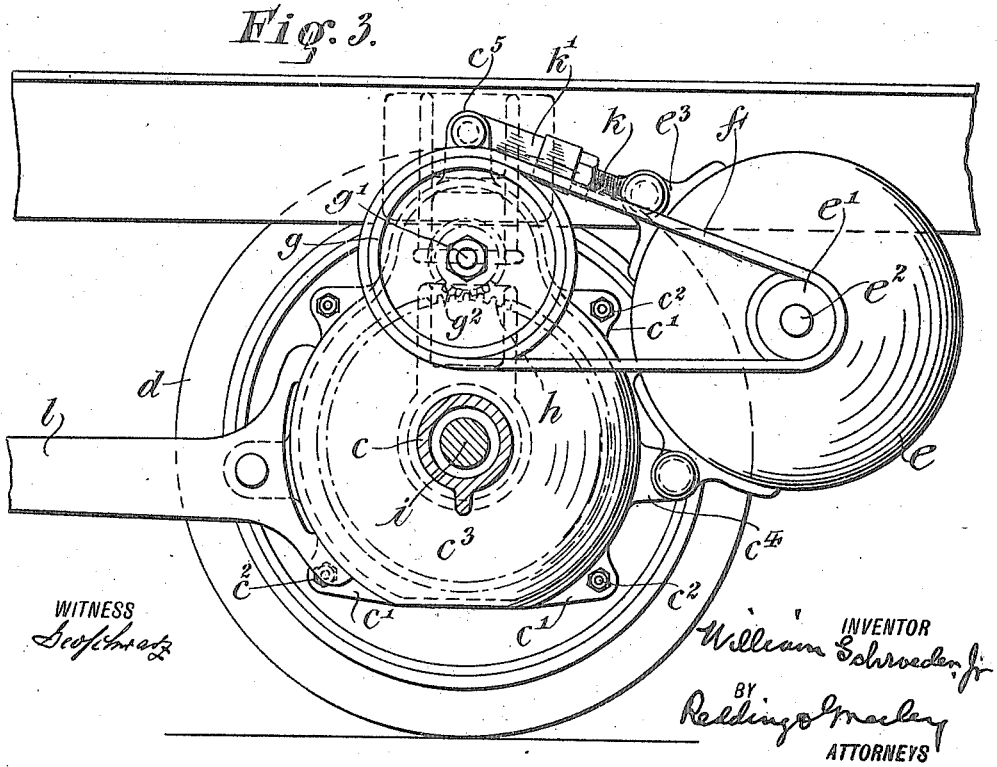

1,445,604

UNITED STATES PATENT OFFICE.

WILLIAM SCHROEDER, JR., OF BROOKLYN, NEW YORK, ASSIGNOR TO ELEVEYOR ELECTRIC INDUSTRIAL TRUCK CO., OF BROOKLYN, NEW YORK, A COPARTNERSHIP COMPOSED OF HIMSELF AND EDWARD B. FORSLUND.

INDUSTRIAL TRUCK.

Original application filed September 17, 1921, Serial No. 501,287. Divided and this application filed June 29, 1922. Serial No. 571,642.

*To all whom it may concern:*

Be it known that I, WILLIAM SCHROEDER, Jr., a citizen of the United States, residing at 312 Lincoln Road, in the borough of Brooklyn, of the city of New York, in the State of New York, have invented certain new and useful Improvements in Industrial Trucks, of which the following is a specification, reference being had to the accompanying drawings, forming a part hereof.

The present application constitutes a division of application Ser. No. 501,287, filed by the present applicant on September 17, 1921.

This invention has for its principal object to provide, in industrial trucks, improved driving mechanism therefor, the propelling motor being so mounted with respect to the differential as to occupy a minimum space and yet afford a large reduction in gear ratio and a simple adjustment between the motor shaft and the final drive. More particularly, the invention is concerned with the provision of a propelling motor which itself may be pivotally mounted on the housing for the differential and adjusted with respect to the drive shaft to permit the effective use of a Morse chain drive. In accordance with the invention it is proposed to interpose between the motor casing and the differential housing a turnbuckle construction by which the angular position of the motor may be changed as necessary to accommodate the chain drive. This chain drive in association with the final drive for the axle sections gives a double reduction with maximum clearance and compactness.

Other features of the invention will appear at greater length in connection with the detailed description on one suitable embodiment of the invention as illustrated in the drawings wherein:

Figure 1 is a view in plan of an improved truck embodying the improvements.

Figure 2 is a view in transverse section through the final drive of the truck.

Figure 3 is a sectional view partly in side elevation and partly in section of the elements shown in Figure 2.

The side frame members $a$ of the truck may be supported through springs $b$ on the dead axle $c$ which carries the drive wheels $d$. One feature of the invention is concerned with the final drive for the wheels $d$ as designed primarily for use on industrial trucks. For convenience in manufacture and assembling the dead axle $c$ may be made in two complementary halves, the meeting edges being flanged as at $c'$ to receive bolts $c^2$ to secure the two halves together. These axle sections are enlarged to provide a differential housing $c^3$. On the differential housing is also cast a lug $c^4$ on which is pivotally mounted the propelling motor $e$. This motor has on its shaft a driving sprocket indicated at $e'$ over which may be passed a transmission belt shown as a Morse chain $f$ for engagement with a driven sprocket $g$ on the intermediate drive shaft $g'$ which is journaled in the differential housing $c^3$ and has thereon a pinion $g^2$ in mesh with the ring gear $h$ of the differential $h'$. Live axle sections $i$ extend outwardly from the differential $h'$ and engage the drive wheels $d$, respectively, preferably through universal joints $i'$ to permit angular movement of the drive wheels for reasons which are understood.

In the construction described it will be apparent that a double reduction between the motor $e$ and the differential $h'$ is obtained through the sprockets $e'$, $g$, which may be of different ratios and between the pinion $g^2$ and the gear $h$. The use of a transmission belt or chain such as $f$ makes it desirable to provide some means for readily adjusting the distance between the shaft $g'$ and the motor shaft $e^2$. To this end, adjusting devices are rigidly interconnected between the motor casing $e$ and the differential housing $c^3$. The preferred form of such devices are illustrated. Lugs $c^5$ are cast on the differential housing $c^3$ and lugs $e^3$ in substantial alignment therewith are cast on the motor casing $e$. Distance rods $k$ which have incorporated intermediate their ends a turnbuckle adjustment $k'$ are pivotally connected to the respective lugs $c^5$, $e^3$. By setting up or backing off the turnbuckle the motor casing $e$ may be swung about its pivotal support on the lug $c^4$ and the center of the motor shaft $e^2$ thereby moved towards or away from the center of the shaft $g'$. The chain $f$ is tightened or loosened accordingly. The shaft $g'$ extends through the side of the wall of the differential housing $c^3$ to support a brake drum $g^3$ by means of which braking stresses may be directly applied to the driving mechanism.

To insure flexibility with yet a sufficient degree of rigidity the driving effort through the rear wheels $d$ is transmitted from the dead axle $c$ through the chassis by means of a torque rod $l$ which may be connected at one end to the differential housing $c^3$ and at the other end to the chassis. In the illustrated embodiment a ball and socket connection $m'$ between the torque rod $l$ and a truss $a'$ is illustrated and such a connection permits angular movement of the torque rod with respect to the frame under the influence of movements of the dead axle $c$.

The parts described, it will be observed, are simple and inexpensive to manufacture, easy to assemble and adjust, and thoroughly efficient in operation providing flexibility in the inter-relation of frame and drive, with yet sufficient rigidity and stiffness to resist the stresses which approach a critical point. However, changes in details of construction may be made without departing from the spirit of the invention provided such modifications fall within the scope of the appended claims.

I claim:

1. In an industrial truck, driving mechanism therefor, including a dead axle, a differential housing thereon, a differential gear supported within the housing and in driving engagement with live axle sections, a propelling motor pivotally mounted on the differential housing, an adjustable distance rod connected to said motor and to said differential housing and driving mechanism for the differential operatively interposed between said motor and said differential.

2. In an industrial truck, driving mechanism therefor including a dead axle, a differential housing formed therein, a differential gear supported in the housing, live axle sections operatively engaged by said gear, a propelling motor mounted pivotally on the differential housing and having a drive shaft, an adjustable connection between the motor and the differential housing to adjust the position of the motor shaft with respect to the differential housing, a final drive shaft operatively geared to said differential gear to afford one reduction in speed and connected operatively with the motor shaft through transmission elements which afford a second reduction in speed.

3. In an industrial truck, driving mechanism therefor including a dead axle having a differential housing, a differential gear mounted therein, live axle sections engaged by the gear, a propelling motor mounted pivotally on the housing and having a propelling shaft carrying a sprocket, a final drive shaft journaled in the differential housing and geared operatively to the ring gear of the differential to afford one reduction in speed, a driven sprocket on the end of said last named shaft, a driving chain engaged operatively with both of said sprockets and an adjustable distance rod interposed between the motor and the differential housing to afford an adjustment of the centers of said sprockets.

4. In an industrial truck, driving mechanism therefor including a dead axle having a differential housing, a differential gear mounted therein, live axle sections engaged by the gear, a propelling motor mounted pivotally on the housing and having a propelling shaft carrying a sprocket, an intermediate drive shaft journaled in the differential housing and geared operatively to the ring gear of the differential to afford one reduction in speed, a driven sprocket on one end of said last named shaft, a driving chain engaged operatively with both of said sprockets and an adjustable distance rod interposed between the motor and the differential housing to afford an adjustment of the centers of said sprockets, and a brake drum on the other end of said intermediate drive shaft.

This specification signed this 28th day of June A. D. 1922.

WILLIAM SCHROEDER, Jr.